Oct. 27, 1936.   T. S. McDERMOTT   2,059,132
NEEDLED FABRIC
Filed July 9, 1935

Inventor.
Thomas S. McDermott
by Heard Smith & Tennant.
Attys.

Patented Oct. 27, 1936

2,059,132

UNITED STATES PATENT OFFICE 2,059,132

NEEDLED FABRIC

Thomas S. McDermott, Franklin, Mass., assignor to Clark-Cutler-McDermott Company, Franklin, Mass., a corporation of Massachusetts Application July 9, 1935, Serial No. 30,482

1 Claim. (Cl. 28—4)

This invention relates to a needled felt fabric and particularly to a needled felt fabric which is designed for use as a rug. Rug fabrics of this type are usually made with a backing of burlap or some other suitable woven material and a body layer of unspun fibres, said layers being secured together by a needling operation, that is, by pricking through the superposed layers with needles. This operation results in carrying some of the fibres of the body layer into and through the base layer of woven material, thereby interlocking such fibres to the base layer.

It is also customary to apply some suitable binding material or sizing material to the back of the fabric for the purpose of more securely binding into the base layer of woven material the fibres which have been punched through or into the base layer or are interlocked therewith by means of the needling operation.

One of the objects of the present invention is to provide improvements in needled felt fabric of this type by which the fibres of the body layer are more securely anchored in the completed fabric and which, therefore, has improved wearing qualities.

Another object of the invention is to provide a needled felt fabric which is especially suitable for use as a rug and which has an increased resiliency, thus giving the rug a springy characteristic which renders it soft to the tread.

Other objects of the invention are to improve fabrics of this nature in various ways as will be more fully hereinafter set forth.

The above objects are accomplished by making the fabric with an intermediate layer situated between the base layer and the body layer and formed of unspun fibres which are relatively long compared with the fibres of the body layer and which have greater resilient characteristics than those of the body layer. During the needling operation some of the fibres of the intermediate layer are carried through and interlocked with the base layer and some of the fibres of the body layer are carried through and interlocked with the intermediate layer and also with the base layer. The intermediate layer, being composed of unspun fibres which are relatively long compared with the fibres of the body layer and which are more resilient than the fibres of the body layer, constitutes a relatively porous layer which will be readily impregnated with the sizing or binding material when it is applied to the back of the fabric. As a result in the completed fabric the base layer and the intermediate layer are impregnated with the sizing or binding material and the fibres of the body layer which are carried into or through either the intermediate layer or the base layer are bound into said intermediate and base layer by the binding material thereby increasing the security with which the fibres of the body layer are held in the fabric.

In order to give an understanding of the invention I have illustrated in the drawing a selected embodiment thereof which will now be described after which the novel features will be pointed out in the appended claim.

Figure 1:
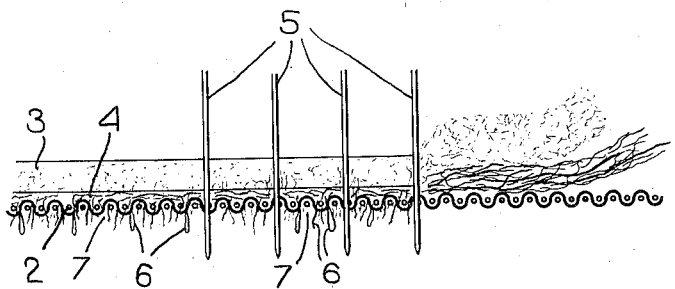
Fig. 1 is a view more or less diagrammatic in its nature showing some steps in the method of making a fabric embodying the invention.
Figure 2:
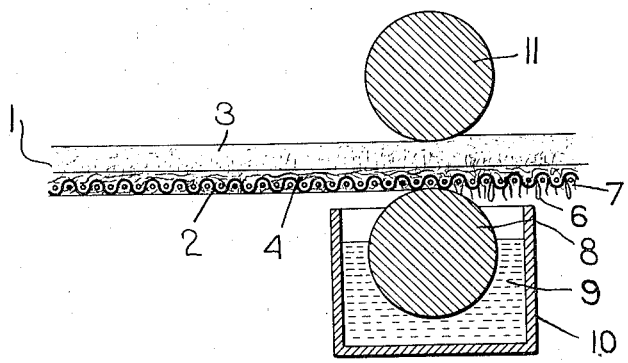
Fig. 2 illustrates one manner of applying the binding material to the fabric.

In the drawing 1 indicates generally a rug material embodying the invention. This material comprises a base layer 2 of woven fabric such, for instance, as burlap, a body layer 3 of unspun fibre which forms the wear surface of the rug and an intermediate layer 4 interposed between the base layer 2 and the body layer 3, and composed of unspun fibres which are relatively long and resilient compared to the fibres of the body layer 3.

These superposed layers are subjected to a needling action by needles 5 of any suitable needle loom as a result of which needling action some of the relatively long fibres 6 of the intermediate layer 4 are carried through or interlocked with the base layer 2 and some of the fibres 7 of the body layer 3 are interlocked with the intermediate layer 4 and the base layer 2. After the needling operation is completed some suitable sizing or binding material in liquid form is applied to the back of the fabric, and this may be conveniently done by passing the needled fabric over a roll 8 which dips into or is partially submerged in the sizing material 9 contained in a tank 10. If desired, a presser roll 11 may be employed to hold the back of the fabric against the roll 8.

Because the fibres of the intermediate layer 4 are considerably longer and more resilient than the fibres of the body layer 3, said layer 4 has greater porosity than the layer 3, and hence when the sizing 9 is applied to the back face of the fabric it readily penetrates and impregnates the base layer 2 and also readily penetrates and impregnates the intermediate layer 4 so that the fibres 7 of the body layer 3 are subjected to the binding action of the binding material 9 throughout the thickness of the base layer 2 and the intermediate layer 4.

While the body layer 3 may be composed of any suitable unspun fibre, yet I find good results are secured by using jute fibre or a mixture of jute and wool fibre.

For the intermediate layer 4 I find excellent results are secured by using sisal fibre which is a relatively long fibre, much longer than the jute or wool fibre, and which is also a stiffer, more wiry and resilient fibre than the jute fibre. Furthermore sisal fibre has considerable strength and the use of the layer of unspun sisal fibre in the fabric as above-described adds considerably to the strength of the fabric, this being due partly to the strength of the sisal fibre and partly to the fact that the fibres are relatively long and many of them extend for some distance in the plane of said intermediate layer. Since these relatively long fibres have an indiscriminate position they give strength to the fabric in every direction in the plane thereof as distinguished from the strength given to the fabric in the two directions at right angles to each other of the warp threads and filling threads of the woven fabric 2.

Moreover because of the resilient character of the intermediate layer 4 the completed rug will have a resiliency or yielding quality which is not present in a needled fabric that does not include in its structure the equivalent of the porous resilient layer 4. Hence in my improved fabric not only are the fibres 7 of the body layer 3 bound into the fabric by the binding material throughout the thickness of both the base layer 2 and the intermediate layer 4, thereby increasing the wearing qualities of the fabric when used as a rug, but the intermediate layer 4 introduces into the rug a springy or yielding characteristic thus making it soft to the tread when walked upon.

While different sizing or binding materials may be employed I prefer to use a sizing containing rubber or latex. Such sizing material will readily penetrate the woven fabric layer 2 and the porous intermediate layer 4, but does not so readily penetrate the body layer 3. Because of the open or porous character of the layer 4 the rubber particles of the binding material can readily form a film around each of the fibres 7 of the body portion that project into or through either or both of the layers 2 and 4 and thereby a stronger bond is provided.

I claim.

A needled felt fabric for use as a rug comprising a base layer of woven material, a body layer of unspun fibres, an intermediate layer of unspun fibres which are longer and stiffer than the fibres of the body layer, some of the fibres of the intermediate layer being interlocked with the base layer and some of the fibres of the body layer being interlocked with both the intermediate layer and the base layer, said base layer and intermediate layer being impregnated with a binding material containing rubber which not only binds the base layer and intermediate layer together but binds into both of said layers the fibres of the body layer which are interlocked therewith, the intermediate layer having greater porosity and being more easily impregnated with the binding material than the body layer and also being more resilient than the body layer thereby giving the fabric a springy characteristic.

THOMAS S. McDERMOTT.